(12) United States Patent
Gallant et al.

(10) Patent No.: US 10,637,818 B2
(45) Date of Patent: Apr. 28, 2020

(54) SYSTEM AND METHOD FOR RESETTING PASSWORDS ON ELECTRONIC DEVICES

(71) Applicant: ETAS Embedded Systems Canada Inc., Waterloo (CA)

(72) Inventors: Robert Philip Gallant, Corner Brook (CA); Robert John Lambert, Cambridge (CA)

(73) Assignee: ETAS Embedded Systems Canada Inc., Waterloo (CA)

( * ) Notice: Subject to any disclaimer, the term of this patent is extended or adjusted under 35 U.S.C. 154(b) by 0 days.

(21) Appl. No.: 16/371,990

(22) Filed: Apr. 1, 2019

(65) Prior Publication Data
US 2019/0230057 A1 Jul. 25, 2019

Related U.S. Application Data

(62) Division of application No. 15/153,081, filed on May 12, 2016, now Pat. No. 10,291,567.

(60) Provisional application No. 62/169,208, filed on Jun. 1, 2015, provisional application No. 62/242,867, filed on Oct. 16, 2015.

(51) Int. Cl.
*H04L 29/06* (2006.01)
*H04L 12/58* (2006.01)
*G06F 21/31* (2013.01)

(52) U.S. Cl.
CPC .............. *H04L 51/22* (2013.01); *G06F 21/31* (2013.01); *H04L 51/04* (2013.01); *H04L 63/083* (2013.01); *H04L 63/123* (2013.01); *G06F 2221/2131* (2013.01)

(58) Field of Classification Search
CPC ....... H04L 51/22; H04L 51/04; H04L 63/083; H04L 63/123; G06F 21/31; G06F 2221/2131
See application file for complete search history.

(56) References Cited

U.S. PATENT DOCUMENTS

| 5,652,793 | A | * | 7/1997 | Priem | G06F 21/10 340/5.74 |
| 5,754,652 | A | * | 5/1998 | Wilfong | G06Q 20/4012 340/5.85 |
| 8,046,827 | B2 | * | 10/2011 | Corella | G06F 21/31 713/168 |
| 8,078,881 | B1 | ‡ | 12/2011 | Liu | G06F 21/31 713/183 |
| 8,607,330 | B2 | * | 12/2013 | Childress | G06F 21/31 726/18 |

(Continued)

*Primary Examiner* — Sarah Su
(74) *Attorney, Agent, or Firm* — CPST Intellectual Property; Brett J. Slaney

(57) ABSTRACT

A system and method are provided for enabling a password reset mechanism for a secured device that verifies a digital signature on a password reset message. The password reset message has been generated by a password reset service for an authorized administrator associated with the secured device. The password reset mechanism allows the authorized administrator to make a request to the password reset service for a password reset, and receive the password reset message such that a password reset can be performed at the secured device. In this way, the secured device's password can be reset absent a connection to a command and control center or other service.

23 Claims, 10 Drawing Sheets

(56) References Cited

U.S. PATENT DOCUMENTS

| | | | | |
|---|---|---|---|---|
| 9,002,750 B1* | 4/2015 | Chu | | H04L 63/0838 |
| | | | | 705/55 |
| 2006/0230283 A1* | 10/2006 | McBride | | G06F 21/31 |
| | | | | 713/184 |
| 2007/0195998 A1* | 8/2007 | Le Saint | | G06F 21/32 |
| | | | | 382/115 |
| 2007/0269042 A1‡ | 11/2007 | Tanaka | | H04K 1/00 |
| | | | | 380/44 |
| 2008/0313721 A1‡ | 12/2008 | Corella | | G06F 21/31 |
| | | | | 726/6 |
| 2010/0043062 A1‡ | 2/2010 | Alexander | | G06F 21/36 |
| | | | | 726/6 |
| 2010/0058073 A1‡ | 3/2010 | Ng | | H04L 9/0897 |
| | | | | 713/193 |
| 2011/0016515 A1‡ | 1/2011 | Dhanakshirur | | G06F 21/42 |
| | | | | 726/6 |
| 2012/0155637 A1‡ | 6/2012 | Lambert | | H04L 9/0863 |
| | | | | 380/44 |
| 2013/0137376 A1* | 5/2013 | Fitzgerald | | H04B 5/0056 |
| | | | | 455/41.3 |
| 2013/0212368 A1* | 8/2013 | Peng | | G06F 9/4406 |
| | | | | 713/2 |
| 2014/0219450 A1* | 8/2014 | Huang | | H04W 12/02 |
| | | | | 380/270 |
| 2014/0283007 A1‡ | 9/2014 | Lynch | | G06F 21/316 |
| | | | | 726/17 |
| 2014/0325622 A1‡ | 10/2014 | Luk | | H04L 63/083 |
| | | | | 726/6 |
| 2015/0304303 A1‡ | 10/2015 | Thibadeau, Sr. | | H04L 63/083 |
| | | | | 726/5 |
| 2015/0319149 A1* | 11/2015 | Alshammari | | H04L 9/0869 |
| | | | | 713/171 |
| 2016/0125412 A1‡ | 5/2016 | Cannon | | G06Q 20/4014 |
| | | | | 705/44 |
| 2016/0261583 A1‡ | 9/2016 | Zhang | | G06F 21/36 |
| 2016/0321628 A1* | 11/2016 | Xu | | H04L 67/306 |
| 2016/0352702 A1‡ | 12/2016 | Gallant | | H04L 51/04 |
| 2018/0234852 A1‡ | 8/2018 | Fitzgerald | | G06F 21/88 |

\* cited by examiner

‡ imported from a related application

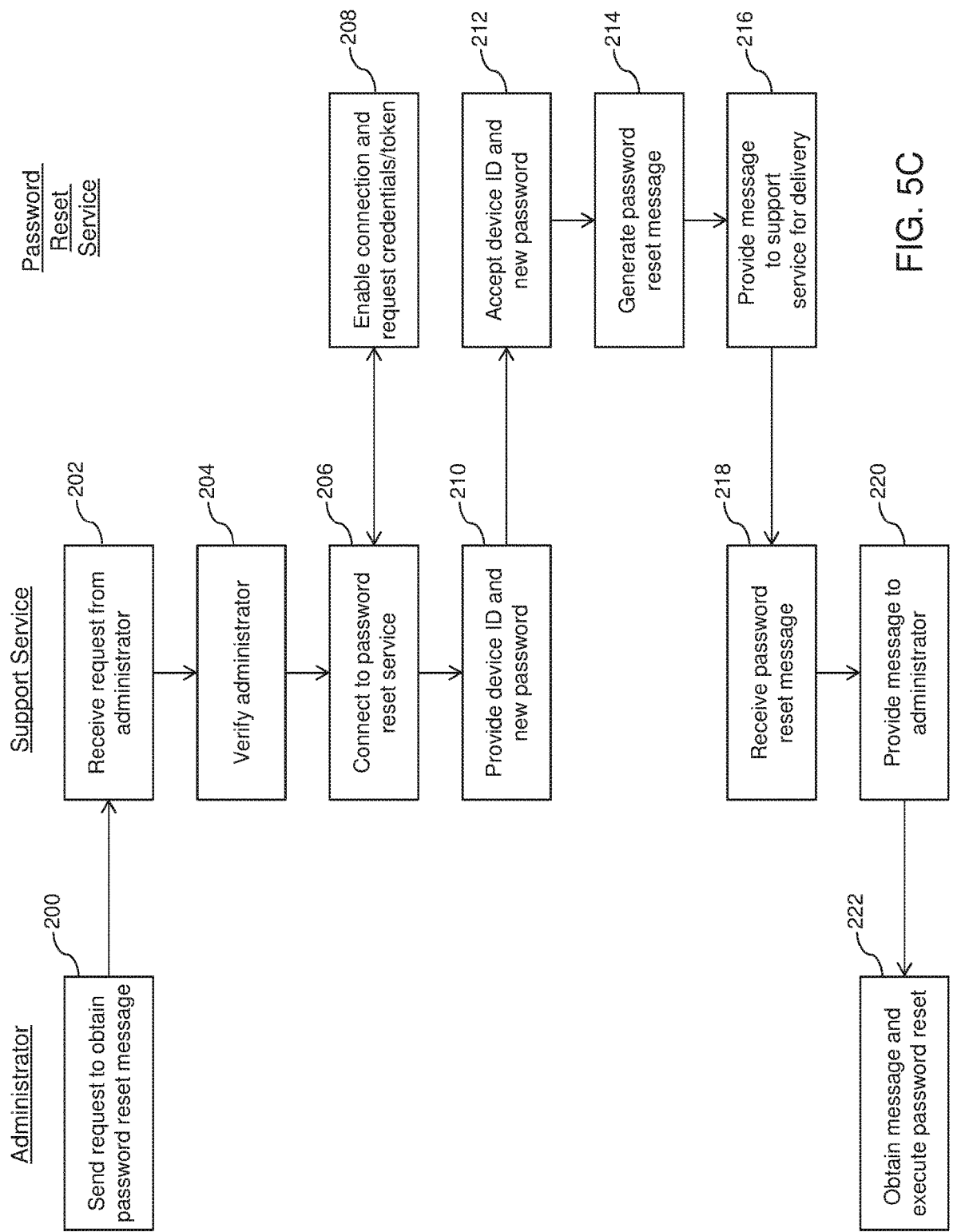

SYSTEM AND METHOD FOR RESETTING PASSWORDS ON ELECTRONIC DEVICES

This application is a division of U.S. patent application Ser. No. 15/153,081 filed on May 12, 2016 which claims priority to U.S. Provisional Patent Application No. 62/169,208 filed on Jun. 1, 2015, and to U.S. Provisional Patent Application No. 62/242,867 filed on Oct. 16, 2015, all incorporated herein by reference.

TECHNICAL FIELD

The following relates to systems and methods for resetting passwords on electronic devices.

DESCRIPTION OF THE RELATED ART

Secured or otherwise protected or controlled devices such as radio communications equipment can sometimes be deployed in remote environments where it can be difficult to control or prevent direct physical access to the device. In order to control access to these secured devices, passwords can be used, which would allow only field personnel in possession of the password to access functions and controls in the secured device, e.g., to perform changes, updates, maintenance, etc.

Passwords need to be remembered and, if lost, a mechanism should be in place to allow the password to be reset. However, for secured devices that are located in remote areas, with limited-to-no connectivity to a command and control center, it can be difficult to provide a password reset mechanism that can be done without such connectivity while maintaining the requisite security of the device.

SUMMARY

In one aspect there is provided a method of generating a password reset message for resetting a password for a secured device, the method comprising: receiving a device identifier for the secured device and a new password; generating the password reset message using the device identifier and the new password; and providing the password reset message to an administrator for the secured device.

In another aspect, there is provided a method of resetting a password used by a secured device, the method comprising: receiving at the secured device, a password reset message and a new password, the password reset message comprising an encoded value derived using the new password; comparing the encoded value in the password reset message to a second encoded value generated at the secured device using the new password; and enabling a password reset operation when the encoded values match.

In yet another aspect, there is provided a method of resetting a password used by a secured device, the method comprising: receiving at the secured device a password reset message, the password reset message comprising an encoded value indicating, in encrypted form, the new password, and authentication and version information; and updating a current password to allow an administrator to use the new password to gain access to the secured device.

BRIEF DESCRIPTION OF THE DRAWINGS

Embodiments will now be described by way of example only with reference to the appended drawings wherein:

FIG. 5C is a flow chart illustrating computer executable instructions for requesting a password reset token using a support service;

DETAILED DESCRIPTION

The following provides a password reset mechanism for a secured device that verifies a digital signature on a password reset message. The password reset message has been generated by a password reset service for an authorized administrator associated with the secured device. The password reset mechanism allows the authorized administrator to make a request to the password reset service for a password reset, and receive the password reset message such that a password reset operation can be performed at the secured device. In this way, the administrator in possession of the password reset message can, in the field and without a connection to a command and control center or any other service, reset a secured device's password.

To address problems associated with replay attacks and message reuse, the password reset message includes various cryptographic controls that utilize, for example, the identity of the secured device, a one-time password, and counters or time-frame specifications to ensure freshness and randomness. An image of the password can also be encrypted to inhibit brute force attacks.

Figure 1:
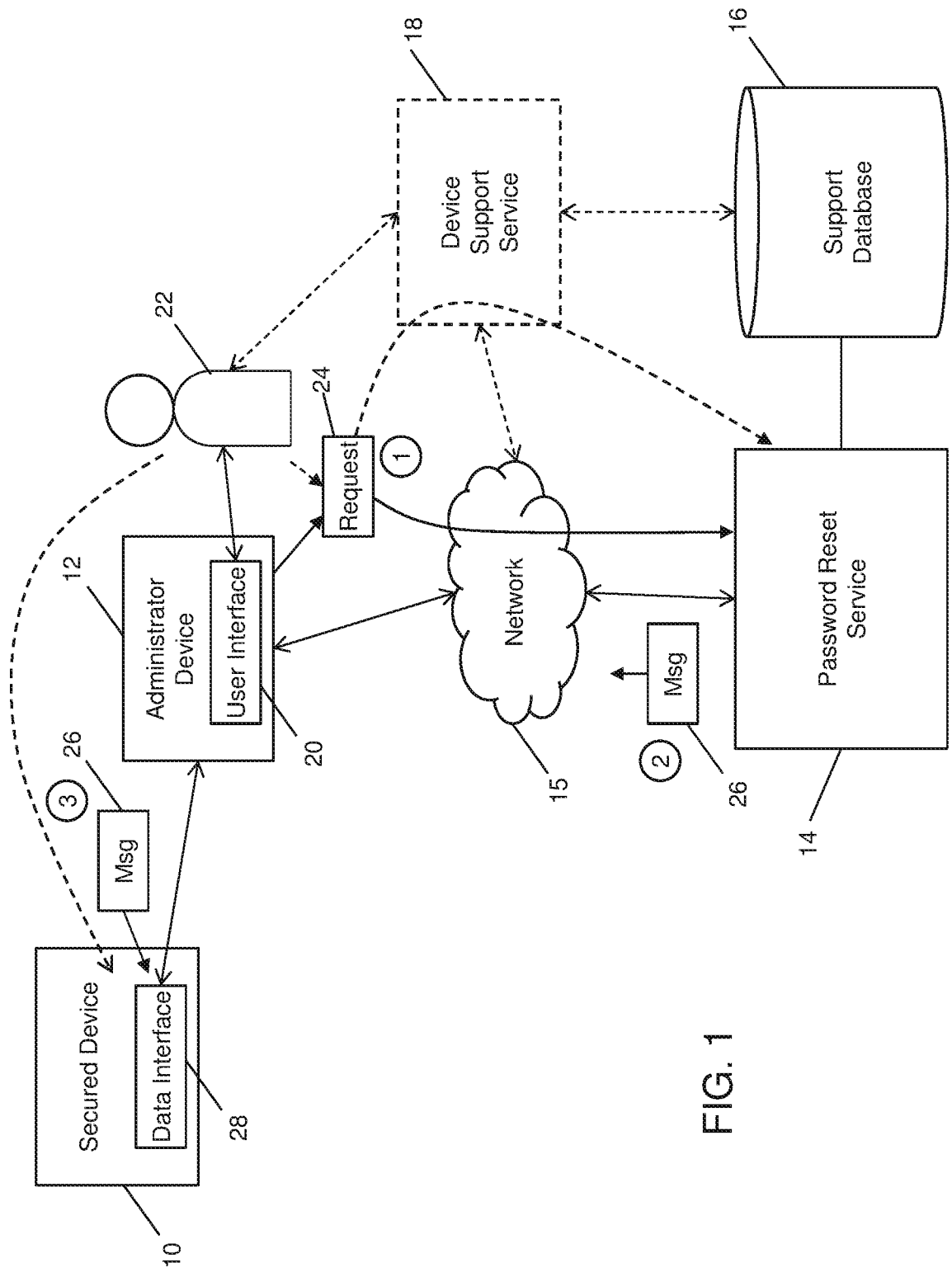
FIG. 1 is a schematic diagram of a system for resetting passwords on electronic devices.

Turning now to the figures, FIG. 1 illustrates a password reset system that enables a secured device 10 to reset a password used by an administrator 22 or other user to gain access to functionality, controls, software, etc. on the secured device 10. The administrator 22 can utilize an administrator device 12 such as a laptop, tablet, smart phone, or other device having a user interface 20 to interact with the secured device 10 and/or a password reset service 14. For example, the administrator device 12 can be used to communicate with the password reset service 14 over a network 15 (e.g., the Internet) in order to send or otherwise submit a password reset request 24. The administrator device 12 can also be used to receive a password reset message 26 generated by the password reset service 14, e.g., over the same or a different network 15.

The password reset message 26 can take any suitable form, such as a data string or other value included in a communication message such as an email, text message, instant message, etc. It can be appreciated that the password reset message 26 can also be provided to the administrator 22 using other media such as a physical memory drive that can interface with the administrator device 12 and/or secured device 10 or be provided as a code, e.g., on a display screen to permit manual re-entry into the secured device 10. The secured device 10 includes a data interface 28 to enable the password reset message 26 or at least portions thereof to be entered into and accepted by the secured device 10 in order to perform a password reset process as described herein.

The password reset service 14 can be accessed directly by an administrator 22 and an administrator device 12, or can be contacted by a third party on behalf of the administrator 22 (an example device support service 18 being shown in dashed lines in FIG. 1). For example, the manufacturer, distributor, or a service related to the secured device 10 can provide a customer support service that interfaces with the password reset service 14 to have password reset messages 26 generated for use in resetting a password on a secured device 10. It can be appreciated that the password reset service 14 can interact with multiple device support services 18 and various administrators 22 which can be related or unrelated to each other by way of organization, product, service, etc.

Since password reset messages 26 will enable access to secured devices 10, access to the password reset service 14 should be properly controlled so that only those individuals with rights to access the secured devices 10 are given access to produce and obtain the subsequently generated password reset messages 26. Whether provided by the device support service 18 or created and maintained by the password reset service 14, a support database 16 is used to enable the password reset service 14 to verify that an administrator 22 making a request 24 is legitimate and thus has permission to reset the password for a particular secured device 10. As discussed below, the support database 16 can also be used to store other information associated with the administrators 22 and secured devices 10. For example, device identifiers such as MAC addresses, serial numbers, etc. can be stored, as well as a public key associated the secured device 10 in order to allow the password reset service 14 to map a device identifier to a public key, e.g., if calling in to the password reset service 14 (or device support service 18) for a password reset message 26 to be generated.

Limiting access to the password reset service 14 can be performed by issuing and checking possession of passwords or tokens (e.g., Fido tokens or other HW tokens used to identify users). The tokens can be in hardware or software form (e.g., in the form of software and data on a smart phone as one example scenario).

As illustrated in FIG. 1, subsequent to any provisioning or initiation operations, in a first stage an administrator provides a request 24 to the password reset service 14 either directly or through a device support service 18 (or other third party). With the proper permissions for the administrator 22 validated by the password reset service 14, the password reset service 14 generates a password reset message 26 in a second stage. In the example shown in FIG. 1, the password reset message 26 is sent via the network 15 to the administrator device 12. In a third stage, the contents of the password reset message 26 are conveyed, entered or otherwise provided to the secured device 10, e.g., via the data interface 28. For example, a communication connection between the administrator device 12 and the secured device 10 can be used to participate in a password reset process. The administrator 22 can also manually enter data via the data interface 28, e.g., to enter a value (series of digits or characters), a new password, etc.

The system shown in FIG. 1 therefore enables secured devices 10 that are remotely located and without a data connection to have a password reset, without requiring the administrator to move back into a region of communication coverage in order to obtain the data required to effect the reset (i.e. in comparison to a challenge/response mechanism which could require the administrator to return to coverage to submit a challenge in order to receive a response for submission to the device 10 which remains remotely located).

Figure 2:
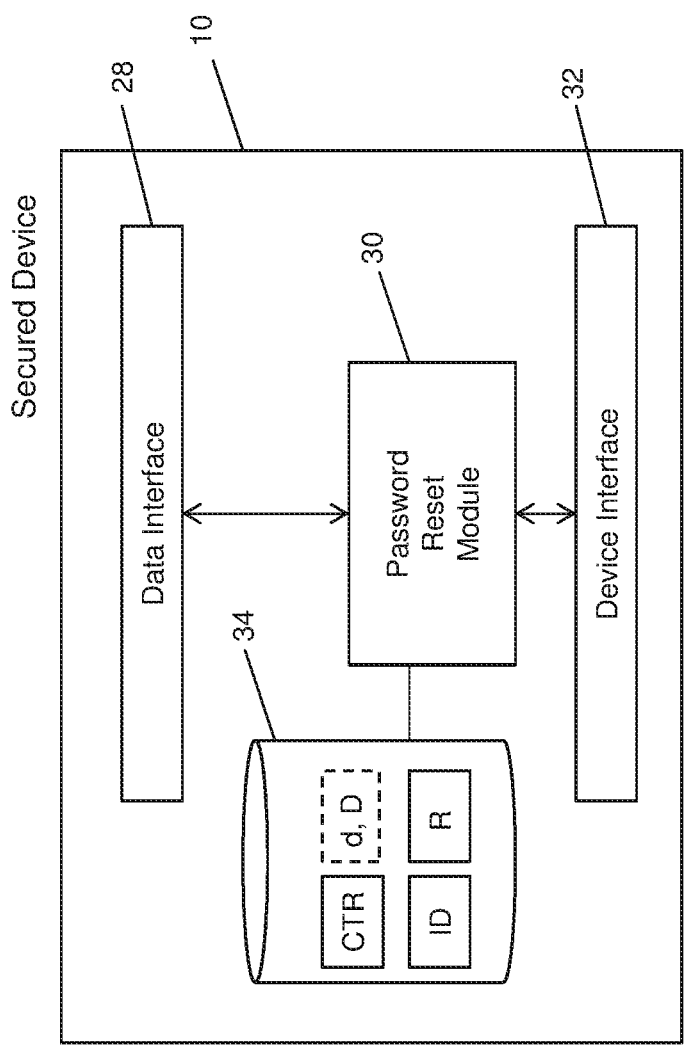
FIG. 2 is a block diagram of an example of a configuration for a secured device.

FIG. 2 illustrates an example of a configuration for a secured device 10, wherein various components and details have been omitted for ease of illustration. The secured device 10 includes a password reset module 30 to enable an administrator 22 to reset a password for the secured device 10. The secured device 10 includes a data interface 28 as was illustrated in FIG. 1, to enable data to be provided to the password reset module 30. Also shown in FIG. 2 is a device interface 32, which enables the password reset module 30 to communicate with at least one other module or component in the secured device 10, e.g., a password-protected area of the controls or functions provided by the secured device 10. It can be appreciated that the password reset module 30 can be part of, or independent of, a password entry function or module used by the secured device 10 which is associated with the password being reset.

The password reset module 30 includes or has access to a data storage element 34, which can be a cryptographically secured module or memory element, for storing cryptographic keys and other sensitive data. For example, as shown in FIG. 2, the data storage element 34 stores a counter value (CTR), a device identifier (ID), a public key (R) of the password reset service 14, and optionally a private/public key pair for the device itself (d, D). The public key R in the example described herein has a corresponding private key r, which is held by the password reset service 14. The public key R can also be provided using a digital certificate that has been signed by a certificate authority (CA), or may be provided on its own without using a certificate. The password reset service 14 can operate as the CA for issuing and maintaining such certificates, when applicable. However, other CAs could also be used.

Figure 3:
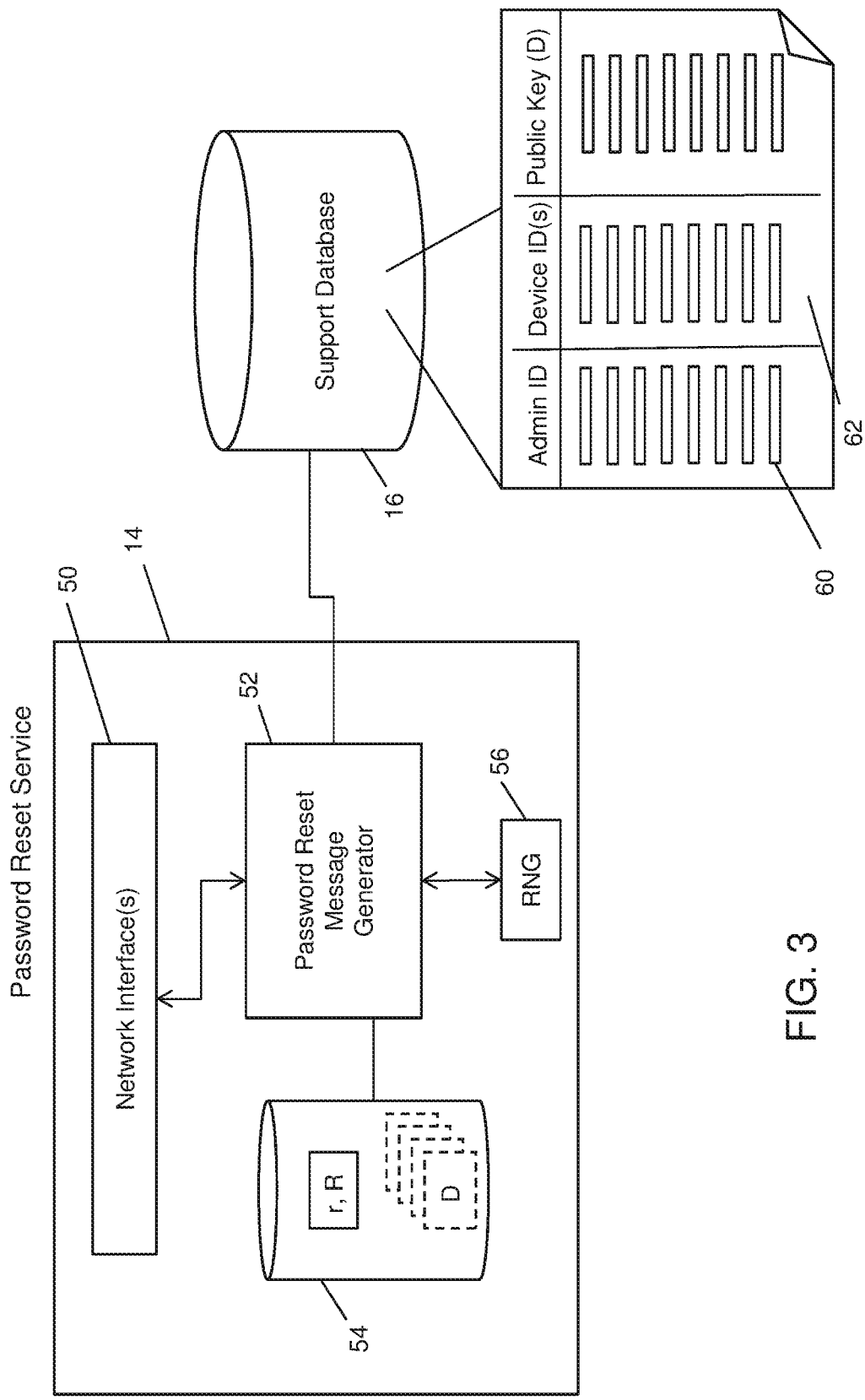
FIG. 3 is a block diagram of an example of a configuration for a password reset service device or server.

FIG. 3 illustrates an example of a configuration for a device or server operating as the password reset service 14. The password reset service 14 includes a password reset message generator 52 having cryptographic capabilities, which is configured for generating the password reset messages 26. The password reset service 14 also includes a network interface 50 to enable administrators 22, device support services 18, etc. to communicate with the password reset service 14, e.g., to make requests 24, access accounts, etc. The password reset service 14 also includes or otherwise has access to a random number generator (RNG) 56, which is used by the password reset message generator 52 to generate password reset messages 26 in at least one implementation. It can be appreciated that the RNG 56 may also be integral to the password reset message generator 52, e.g., as part of a cryptographic toolkit, cryptographic hardware, or other cryptographic functionality. The password reset service 14 also includes a secure memory 54 for storing its private/public key pair r, R, and other sensitive data, such as copies of public keys of the various secured devices 10 (D).

As illustrated in FIG. 3 (and also shown in FIG. 1), the password reset service 14 accesses a support database 16, which stores information allowing the password reset service 14 to not only determine whether a particular administrator 22 is permitted to reset a password for a particular secured device 10, but also to determine a communication address for the administrator 22 for delivering the password reset message 26. The support database 16 can include any suitable data structure for storing the requisite information, and includes a series of administrator IDs 60 associated with corresponding device IDs 62. It can be appreciated that a single administrator 22 can be associated with multiple device IDs 62, e.g. if a particular administrator 22 is responsible for a set or fleet of secured devices 10. As shown in FIG. 3, the support database 16 can also include copies of secured device public keys D and associate the public keys D with the secured devices 10, thus providing a mapping between device ID(s) and the public key D for that secured device 10. In this way, an administrator 22 can initiate a password reset by phoning in to the password reset service 14 (or device support service 18) and provide a device ID such as a MAC address or serial number, which can be mapped to the corresponding public key D.

The password reset service 14 checks the credentials of the administrator 22, for example, by checking that the administrator 22 possesses a certain password (typically by checking a hash of that password), or by performing a challenge response protocol with a access token possessed by the administrator 22, or by some other means of validating that the administrator 22 indeed is in possession of some secret credential, and is therefore authentic.

It can be appreciated that an administrator 22 will often pre-provision a password reset message 26 before going out into the field where secured devices 10 are to be accessed. The administrator 22 would have the password reset messages 26 produced and stores them securely, perhaps in some portable encrypted store for transport into the field. The administrator 22 would also possess the associated password for use after passwords have been reset. The passwords will also be stored securely, for example in a separate encrypted storage device, or in the administrator's own memory. In order for an administrator 22 to perform a password reset, a provisioning process, a password reset request process, a password reset generation process, and a verification of a password reset message process are performed.

Figure 4:
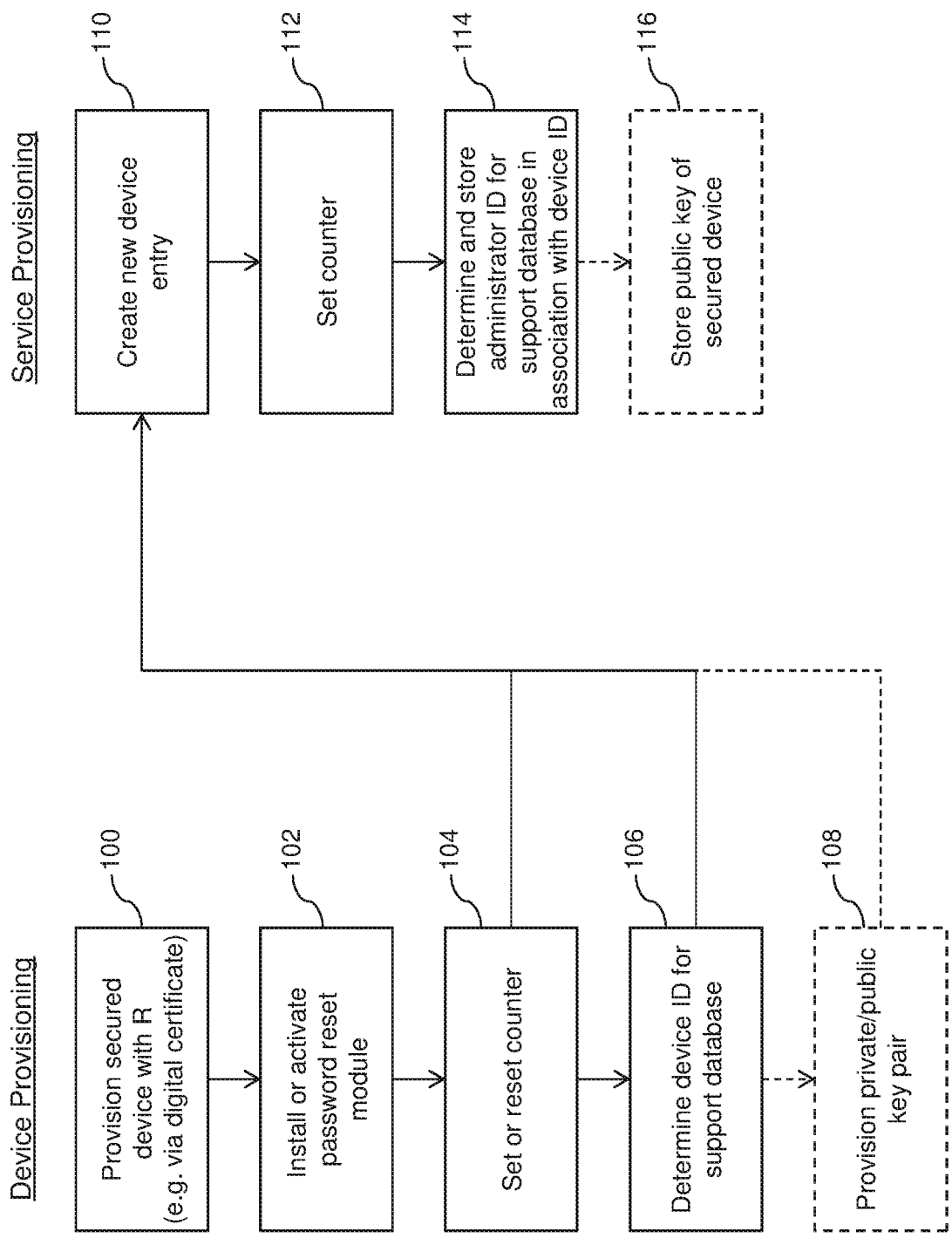
FIG. 4 is a flow chart illustrating computer executable instructions for provisioning a secured device to enable passwords to be subsequently reset.

FIG. 4 illustrates an example of provisioning steps performed on the secured device 10 and at the password reset service 14. At 100 the secured device 10 is provisioned with a public key R of the password reset service 14, for verifying password reset messages 26. For example, a digital certificate which has been signed by a CA (which can be the password reset service 14) can be provided to the secured device 10 with the digital certificate including the public key R. It can be appreciated that using digital certificates to provide the public key R is only one method, for example, the public key R can be provided on its own. If necessary, the password reset module 30 is installed or activated or initiated at 102 in order to enable the secured device 10 to verify password reset messages 26 and perform a password reset operation as described below. As will be explained further below, a replay protection value can be incorporated into the password reset message 26 in order to prevent against replay attacks. For example, the CTR can be used to ensure that a password reset message 26 is only used once. When a CTR is used, the CTR may need to be set, reset, or otherwise be given a value at 104 that is synchronized with the password reset service 14 such that as password reset requests 24 for that secured device 10 are made, the CTR is incremented accordingly. To avoid the CTR value wrapping, the system can be configured such that the secured devices 10 only respond to a finite number of password reset messages 26.

While the examples provided herein utilize a CTR value as the replay protection mechanism, other mechanisms can be used. Another example of a replay protection value is a time-frame reference. In such an example, if the secured devices 10 have available an authentic time reference, then password reset messages 26 can be issued to be valid only in a certain time frame. The time reference is used to determine if the presented password reset message is valid in time. For example, a password reset message 26 may specify a starting and ending time period during which it is valid. The secured device 10 can then check if the password reset message 26 being used is valid by comparing the valid time interval specified in the message 26 with the current time as indicated by the authentic time reference. Validity time frames and validity counters can also be combined to ensure that both counter and time frames are valid before accepting a password reset message 26.

When provisioning the secured device 10, one or more device IDs is/are also determined at 106, which enables the password reset service 14 to establish a record or account for the secured device 10. In some implementations, the password reset message 26 can itself be encrypted. In such implementations, the private/public key pair d, D for the secured device 10 can be provisioned at 108. As discussed above, the public key D can be stored by the support database 16 to provide a mapping between device IDs and the public key D for that secured device 10. The operations performed in order to provision the secured device 10 can be performed at the time of manufacture, at the time of a registration process, or partially at both stages. For example, the digital certificate and password reset module 30 can be provisioned at the time of manufacture while the provisioning of the device ID can be done at the time of registration of the secured device 10 into a particular system.

The password reset service 14 is provisioned with respect to the secured device 10 at any appropriate time, such as at the time of device registration. At 110 a new device entry is made in the support database 16, which stores the device ID, ensures synchronization of the CTR values, stores a public key D if applicable, and stores information associated with the administrator 22, such as an identifier and communication address such as an email address. The communication address enables the password reset service 14 to electronically send the password reset messages 26 to the administrator 22 (e.g., via the administrator device 12). If necessary, the CTR value stored in the secured device 10 is set in the support database 16 at 112 and the administrator ID and device ID are associated with each other in the support database 16 at 114. If applicable, the public key D of the secured device 10 is stored at 116 and mapped to the administrator and device IDs, in order to enable the password reset service 14 to encrypt data that can be decrypted by the secured device 10 using the corresponding private key d.

Figure 5A:
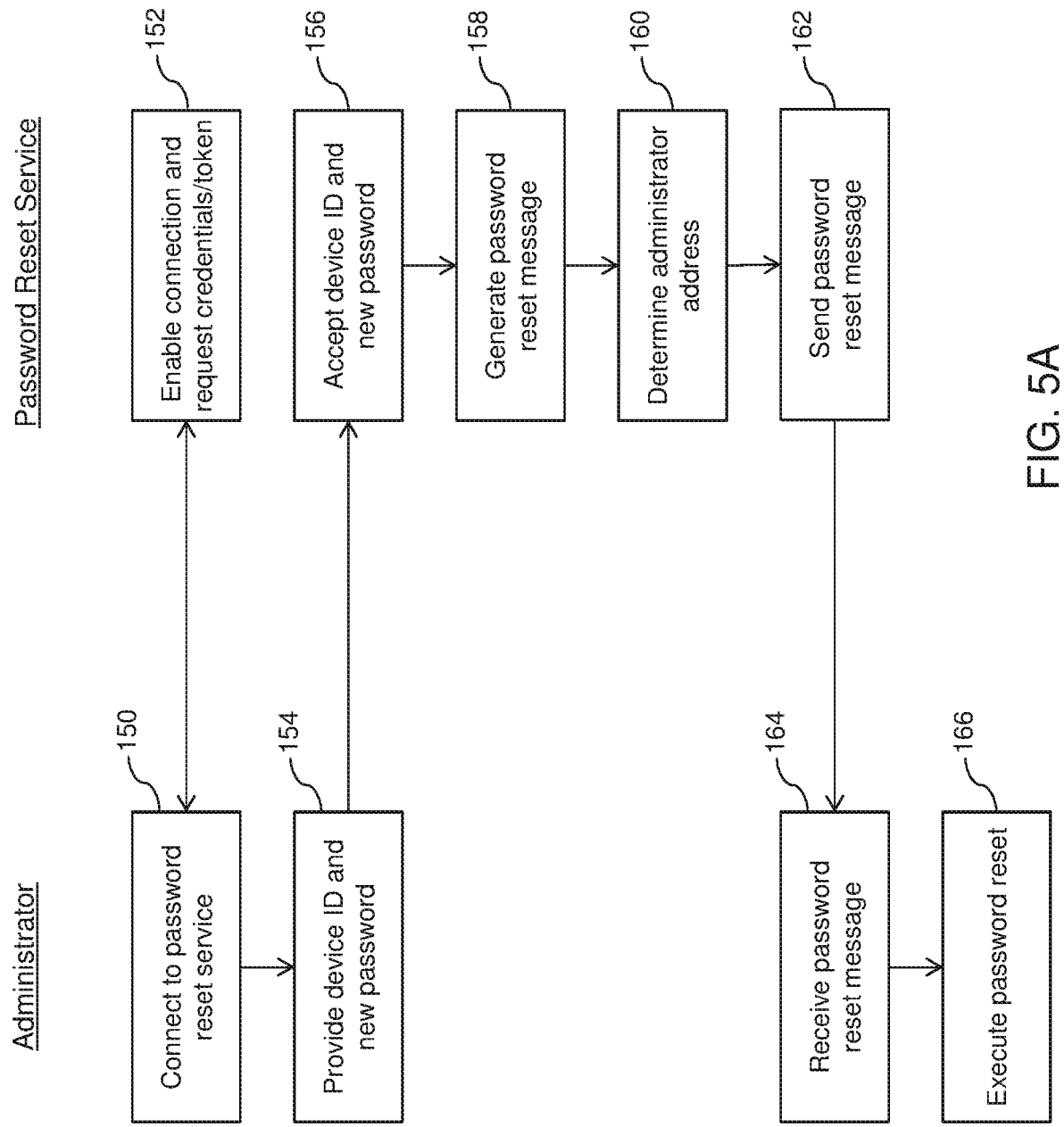
FIG. 5A is a flow chart illustrating computer executable instructions for requesting a password reset token.
Figure 5B:
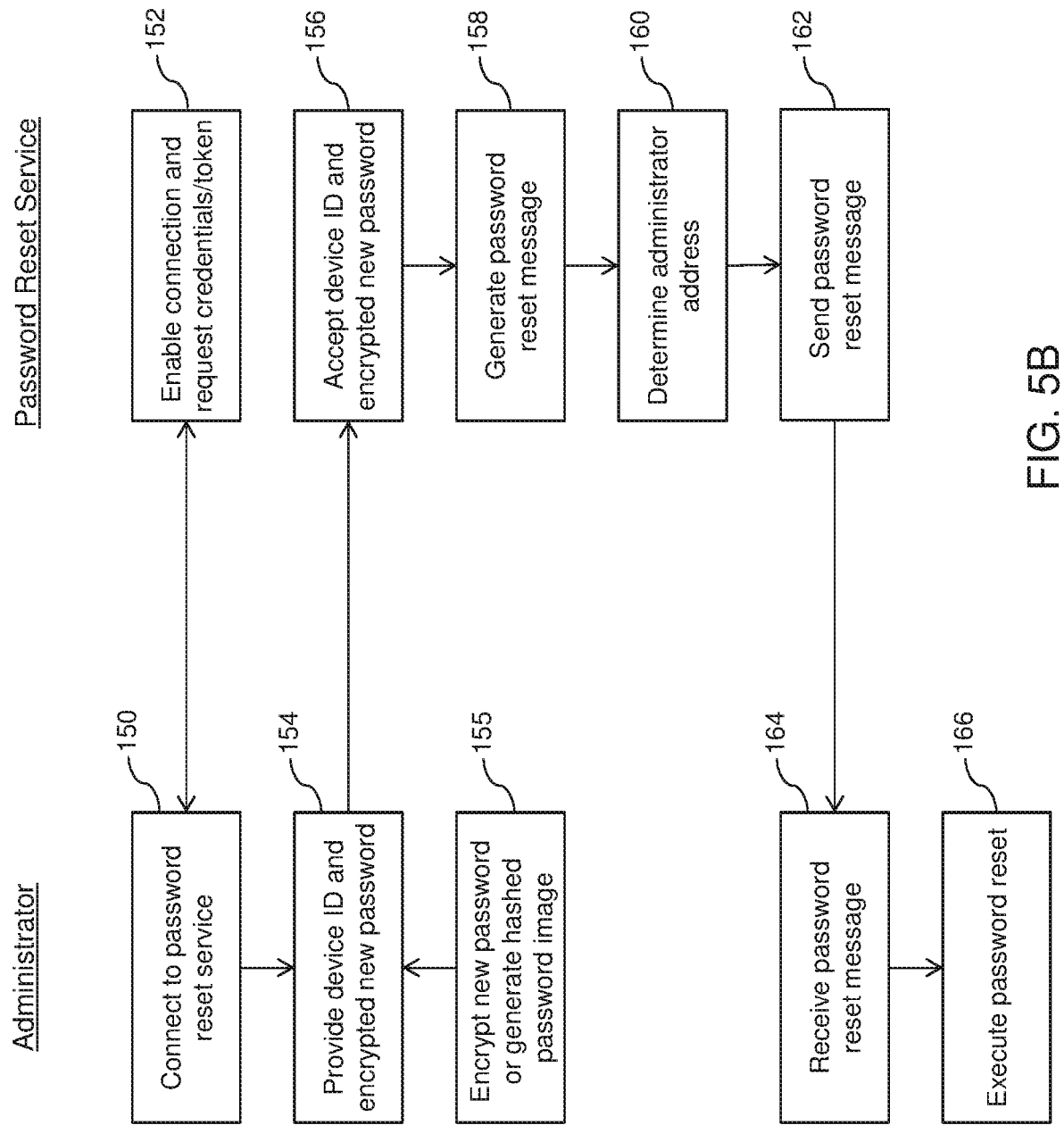
FIG. 5B is a flow chart illustrating computer executable instructions for requesting a password reset token.

One example of a process for requesting a password reset message 26 is shown in FIGS. 5A and 5B, and another shown in FIG. 5C. In FIG. 5A, it is assumed that the administrator 22 communicates with the password reset service 14 directly, e.g., by accessing a web page via the network 15. At 150 the administrator 22 connects to the password reset service 14 and the password reset service 14 enables a connection thereto at 152, e.g., via a login mechanism or by providing other credentials and potentially second factor hardware tokens. It can be appreciated that the administrator 22 may connect to the password reset service 14 using any suitable device, including the administrator device 12 but not limited thereto. The administrator 22 provides a device ID corresponding to the secured device 10 that is the subject of the present request 24 and a new password at 154. The password reset service 14 accepts the device ID and new password at 156 and generates a password reset message 26 at 158. While the example in FIG. 5A illustrates the administrator 22 providing the new password, it can be appreciated that the password reset service 14 could instead generate the new password, e.g., if a temporary password is provided to be followed by entry of an administrator-selected password at the secured device 10. The password reset service 14 then determines an administrator communication address at 160, and sends the password reset message 26 to the administrator 22 at 162, e.g., by embedding a link in an email or embedding the password reset values in the email itself. The password reset message 26 is received at 164 by the administrator 22, e.g., using the administrator device 12, and the password reset process is executed using the secured device 10 at 166.

As illustrated in FIG. 5B, in order that the password reset service 14 itself never knows the actual password, it is also possible that the administrator 22 using the service produces at 155, using the public key of the device 10 to be password reset, an encrypted password or an encrypted hashed password image for the desired device 10 before submitting it to the password reset service 14, thus making sure that this password or password image is not available even to the password reset service 14. The other operations shown in FIG. 5B are similar to those described above with respect to FIG. 5A and thus need not be repeated.

If the password reset service 14 generates the new password, then the new password is communicated to the administrator 22 as well. It is appreciated that, since password reset messages 26 and passwords are sensitive data, all of these communications should be secured, either through the use of secure messaging, such as SSL/TLS a VPN, a physically secure network, or through the combination of such security provisions.

An alternative example is shown in FIG. 5C in which the administrator 22 interfaces with the device support service 18 to obtain the password reset message 26. At 200 the administrator 22 sends a request 24 to the device support service 18 to obtain a password reset message 26. The device support service 18 receives the request 24 at 202 from the administrator 22 and verifies the identity of the administrator at 204, e.g., by requesting credentials via a login mechanism or other security mechanism. The device support service 18 may also verify that the administrator 22 has permission to request password resets for the particular secured device 10 by accessing the support database 16. At 206 the device support service 18 connects to the password reset service 14 and the password reset service 14 enables a connection thereto at 208, e.g., via a login mechanism or other provision of credentials.

The device support service 18, on behalf of the administrator 22, provides a device ID corresponding to the secured device 10 that is the subject of the present request 24 and a new password at 210. Similar to what is shown in FIG. 5B, it can be appreciated that the support service 18 may encrypt the password or generate an encrypted hashed password image such that the password reset service 14 itself does not know the new password. The password reset service 14 accepts the device ID and new password at 212 and generates a password reset message 26 at 214. While the example in FIG. 5C illustrates the support service 18 (e.g., on behalf of the administrator 22) providing the new password, it can be appreciated that the password reset service 14 could instead generate the new password, e.g., if a temporary password is provided to be followed by entry of an administrator-selected password at the secured device 10. Similarly, the device support service 18 could generate the new password rather than the administrator. The password reset service 14 then provides the password reset message 26 to the device support service 18 at 216, and the device support service 18 receives the password reset message 26 at 218 and is responsible for delivering the password reset message 26 to the administrator 22, e.g., by determining an administrator communication address and sending the password reset message 26 accordingly at 220, which is obtained by the administrator 22 at 222.

Figure 6:
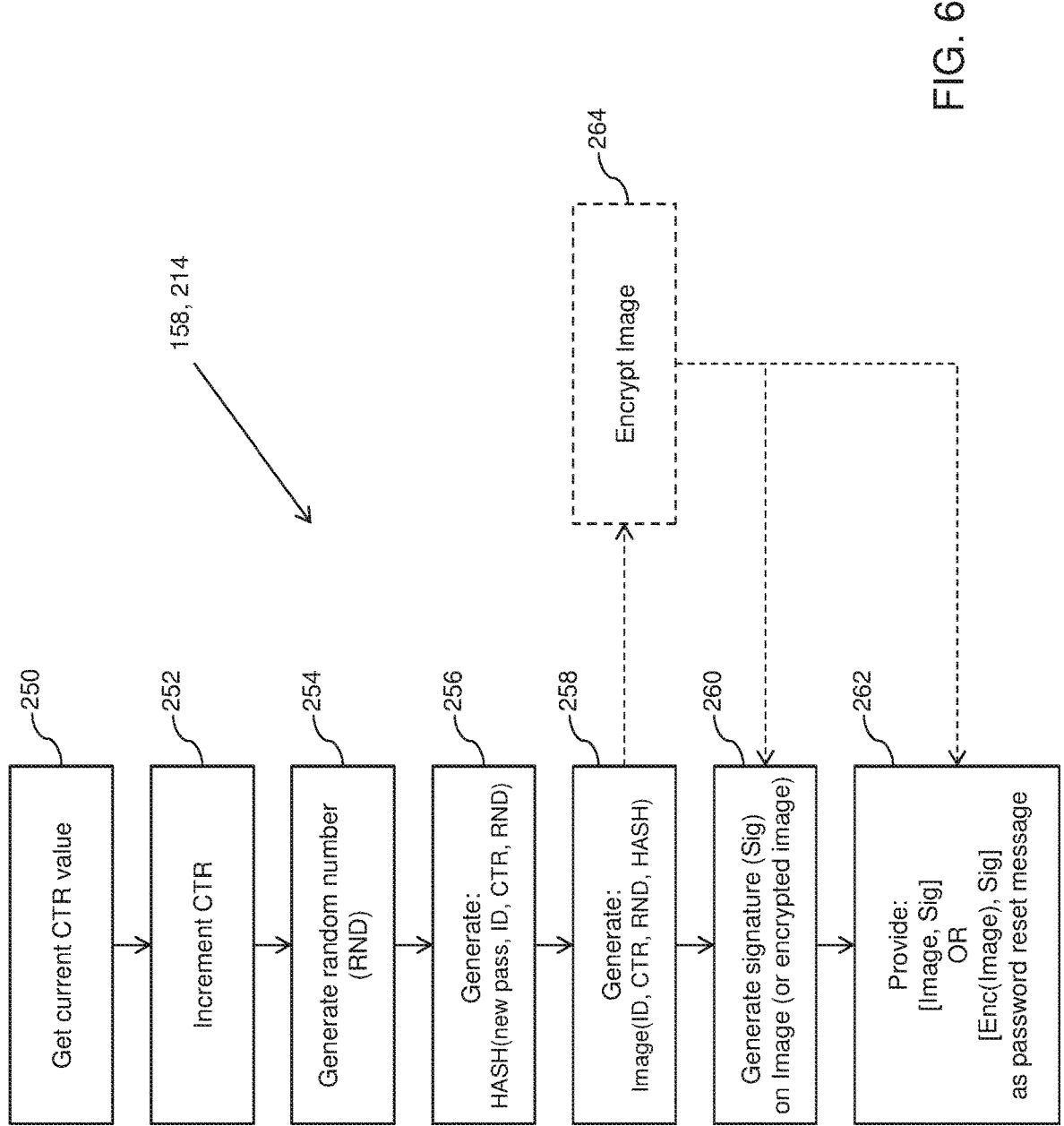
FIG. 6 is a flow chart illustrating computer executable instructions for generating a password reset token.
Figure 7:
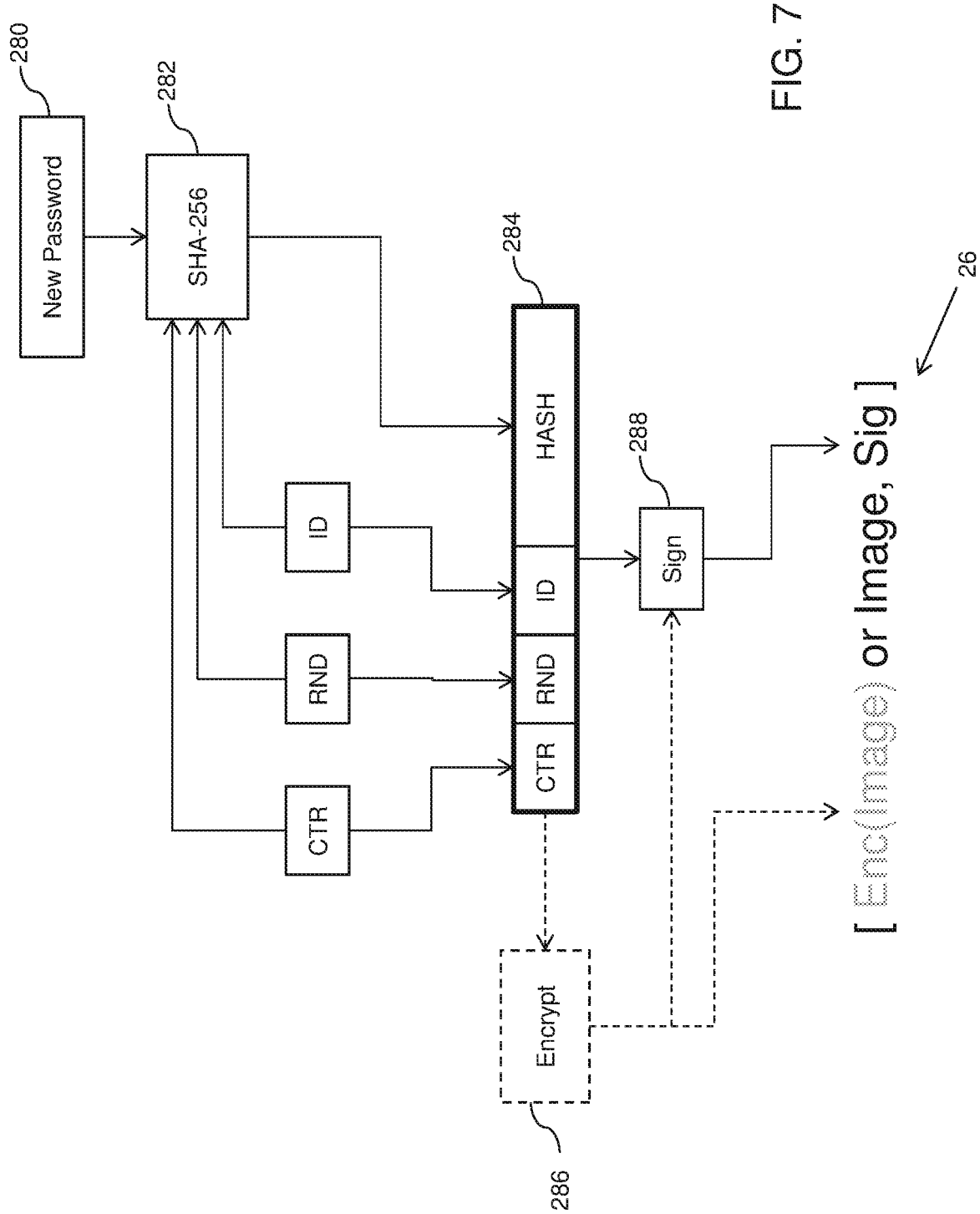
FIG. 7 is a schematic diagram illustrating components used to generate a password reset token message.

FIGS. 6 and 7 illustrate the generation of a password reset message 26. The password reset message 26 is generated for a specific secured device 10 and, as explained below, is bound to that secured device 10 using the device ID. As illustrated above, the password reset service 14 may be accessed, e.g., via the Internet, in order to submit a request 24 providing the device ID for the secured device 10 and a new password. In FIG. 6, the current CTR value is obtained at 250 using the support database 16 and incremented at 252 in a manner consistent with how the secured device 10 increments its CTR for each password reset request. For example, after each password reset, the secured device 10 may increment the CTR by one. As such, the current value in the support database 16 is incremented by one at each request 24 in order to ensure the CTR values are identical. A random number (RND) is generated at 254, often referred to as a "salt" value, to defend against dictionary attacks. A 64-bit salt value (or RND) is one possibility.

A hash is generated at 256, which is to be used by the password reset module 30 in the secured device 10 to match against a hash generated on the secured device 10 using an entered new password, i.e., to confirm that the administrator 22 has possession of the new password 280 associated with the password reset message 26. The hash can be generated using any suitable function such as SHA-1, SHA-2 or SHA-3, or an iteration of such hash functions on the password value, optionally includes a variable known input such as the salt value describe herein and possibly also employing other cryptographic functions such as block ciphers (e.g. AES) etc., in the derivation of these values. In this example, a SHA-256 hash function 282 is used, as shown in FIG. 7. It can be appreciated that a hash is only one example and any cryptographic one-way function could be used.

In this example, the hash is generated using the new password 280, the device ID (shown as ID for brevity), the CTR value, and the RND value that has been generated. This hash is then used at 258 to generate part of a password image 284 (see also FIG. 7), which includes the ID, CTR, and RND values in plaintext, along with the hash. The image value is typically then a deterministic function of the password itself. It can be appreciated that the image could be the password itself, however, this may not be desirable since it could be exposed to some parties.

At 264, if the secured device 10 has been provisioned with a private/public key pair d, D, the public key D can be used to encrypt the image to generate an encrypted password image Enc(Image)—see also 286 in FIG. 7. It has been found passwords may be chosen from a limited set and may be vulnerable to brute-force search or dictionary attacks. In order to prevent the password image from opening up a brute-force attack on a password reset message 26, revealing the new password 280 itself, the password image can be encrypted at 264 using the public key of the secured device 10. As shown in FIG. 6, the encrypted image can be signed at 260, or the signature can be generated using the unencrypted image (whether or not the image is encrypted at 264)—see also 288 in FIG. 7. It can be appreciated that when the secured device 10 is already associated with a public key for other purposes, e.g., to secure communications to/from the secured device 10, the public key D can be reused for implementing password reset processes. Encryption of the image can also prevent an attacker from having a target value to use in order to know when a brute force attack has been successful. Moreover, the encryption algorithm chosen may include injecting randomness into the encrypted result, such that the encrypted result is not deterministic. It can also be appreciated that if the secured device 10 and the password reset service 14 share a symmetric key, symmetric key techniques such as block ciphers (e.g. AES) can be used to encrypt the messages 26.

A signature (Sig) on the image is generated at 260 using the private key r, which corresponds to the public key R that has been provisioned to the secured device 10. Various public-key based signature schemes can be used at 260 to sign the password image, for example any scheme selected from among RSA or discrete-logarithm techniques, e.g., DSA, ECDSA, Schnorr signatures, etc. The public key schemes used to encrypt the image at 264 can also be selected from among various known schemes, including RSA and discrete-logarithm techniques such as Diffie-Hellman using a symmetric scheme keyed with a resulting shared secret, EC Diffie-Hellman, ECIES, ElGamal, etc. It can be appreciated that if the secured device 10 and the password reset service 14 share a symmetric key, symmetric key techniques such as message authentication codes can be used to sign the messages 26.

The resultant password reset message 26 is provided at 262, which includes the password Image (or an encrypted version thereof), and the signature on the image (or on an encrypted image thereof) as illustrated in FIGS. 6 and 7. The password image and signature can be encoded in base 64 encoding as an output.

Figure 8:
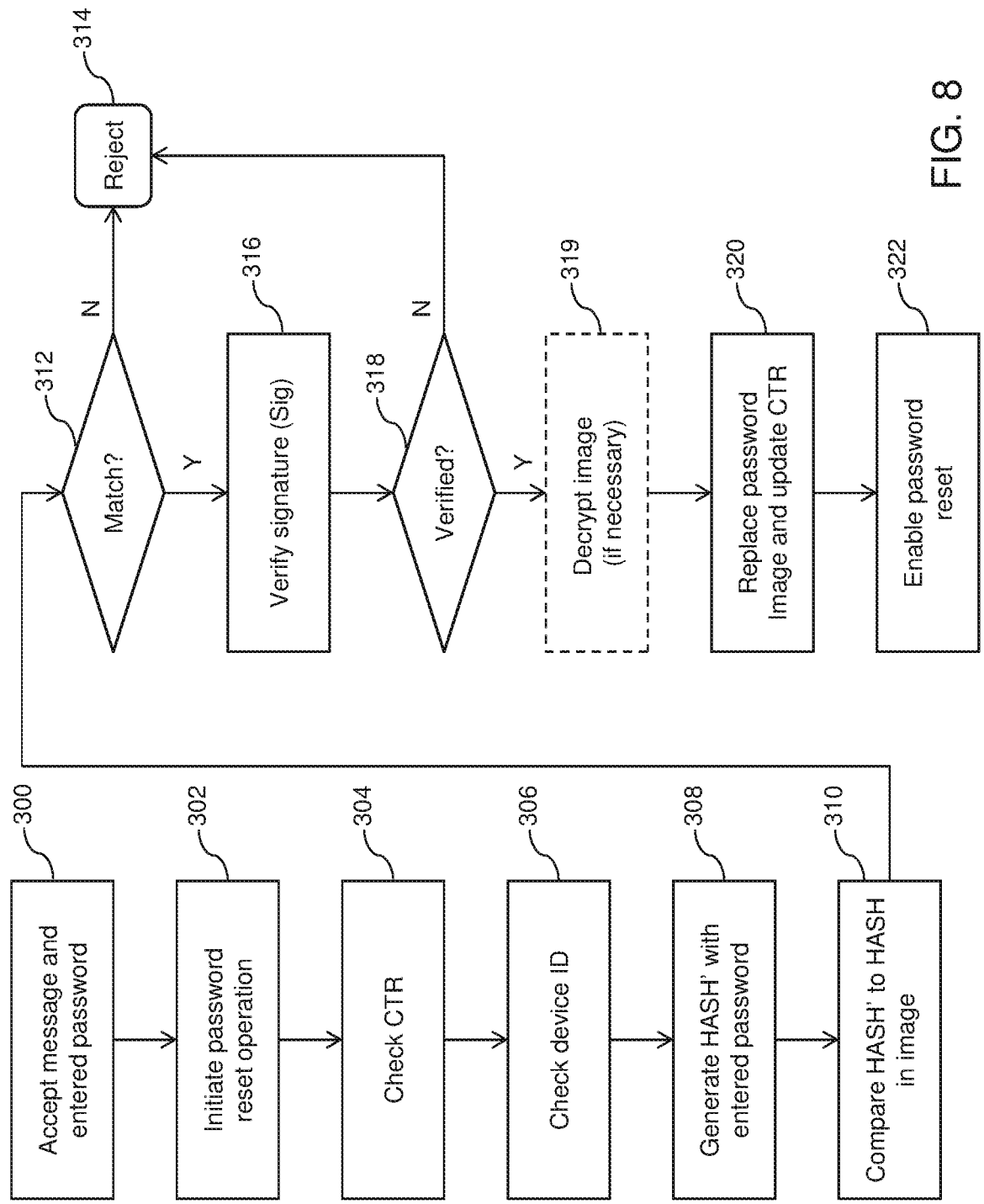
FIG. 8 is a flow chart illustrating computer executable instructions for verifying a password reset token on a secured device.

As was illustrated in FIGS. 5A and 5B, once the password reset message 26 has been generated and provided to the administrator 22, the password reset message 26 is used at the secured device 10 to reset the password. FIG. 8 illustrates a process that may be executed at the secure device 10 for resetting the password. At 300 the password reset module 30 accepts the password reset message 26 (e.g., via the data interface 28) and an entered password, which should correspond to the new password 280 provided to or by the administrator 22, and initiates the password reset operation at 302, which may require an input or interaction from the administrator 22. While not shown in FIG. 8, if the password Image in the password reset message 26 has been encrypted, the Image is decrypted when initiating the password reset operation at 302 in order to obtain the CTR, and device ID values.

The CTR value is checked at 304 to ensure that it is greater than any password reset message 26 previously accepted by the secured device 10. The device ID is also checked at 306 to ensure that the password reset message 26 corresponds to the appropriate secured device 10. It can be appreciated that the device ID may also be included in the digital certificate that is provisioned to the secured device 10, which can be the source of this check.

Using the CTR, ID, and RND values from the image, and the entered password provided at the secured device 10, a hash value HASH' is generated at 308. The HASH' value is compared to the HASH value included in the image at 310 to determine at 312 whether or not the hashes are equal. If not, the message 26 is rejected at 314. This comparison confirms that the entered password is equivalent to the new password 280 used by the password reset service 14 to generate the password reset message 26. The signature (Sig) in the password reset message is then verified at 316 according to the underlying digital signature protocol that was used to sign the image. It is determined at 318 whether or not the signature is verified. If not, the message 26 is rejected. If the signature is verified, the password image is decrypted, if necessary, at 319, the password image replaces any previously stored password image at 320 and the password is reset at 322. Additionally, any counter values CTR or values which are to be updated to ensure freshness of password reset messages 26 are also updated in the secured device's secure memory. It can be appreciated that the operation(s) performed at 322 can include allowing the administrator to provide yet another new password. For example, the new password 280 can be provided as a temporary password, which can be updated at the time of completing the password reset operation. It can also be appreciated that the order of operations shown in FIG. 8 is for illustrative purposes only. For example, the signature verification and, if necessary, image decryption may instead be performed prior to verifying that the hashes match. The signature may also be verified as a first check, e.g., prior to checking the CTR and device ID.

It can be appreciated that the password used to verify the password reset message 26 may be sent in a subsequent message or other transmission, after the password reset message 26 has been provided. In this case, the password reset message 26 is validated, first by checking the signature with the public key R, and next by verifying that the CTR value is later than a stored value. Also, any other field, e.g. a device identifier can be checked to determine if it is correct, or a time-frame indicator can be checked for validity. If these values are validated, then the contained password value, or a password image is written to the secured device's secure memory, any CTR's or changing validation values are also written, and the device is now in a state where it can validate the new password. Subsequently if the correct password (i.e. the password set in the password reset message) is provided to the secure device, it will provide the administrator 22 access. Alternatively, the password reset message 26 can be used in this way to perform a password reset without requiring the new password to be separately entered at all, for example, if administrator access is not required.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the secured device 10, administrator device 12, password reset service 14, support database 16, or device support service 18, any component of or related to such entities, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of generating a password reset message for resetting a password for a secured device, the method comprising:
receiving a device identifier for the secured device and a new password;
signing a password image;
generating the password reset message using the device identifier and the new password, wherein the password reset message includes a digital signature and an encoded value derived using the new password, wherein the password image further comprises the device identifier and a replay protection value, wherein the replay protection value comprises a counter or random value or a combination of the counter and random value; and
providing the password reset message to an administrator for the secured device.

2. The method of claim 1, further comprising encrypting at least a portion of the password reset message.

3. The method of claim 1, wherein the received new password is encrypted or a hashed password image is generated, by the administrator.

4. The method of claim 1, wherein the password reset message further comprises the counter to enable the secured device to compare the counter against a locally stored counter, wherein the password reset message is processed only if the counter value in the password reset message is larger than the locally maintained counter, and wherein if processed, the locally maintained counter is set to the larger value contained in the password reset message.

5. The method of claim 1, wherein the password reset message further comprises a time-frame indicator to enable the secured device to process the password reset message only if a locally available time is within a time-frame provided in the password reset message.

6. A non-transitory computer readable medium comprising computer executable instructions for generating a password reset message for resetting a password for a secured device, the computer readable medium comprising instructions for:
receiving a device identifier for the secured device and a new password;
signing a password image;
generating the password reset message using the device identifier and the new password, wherein the password reset message includes a digital signature and an encoded value derived using the new password, wherein the password image further comprises the device identifier and a replay protection value, wherein the replay protection value comprises a counter or random value or a combination of the counter and random value; and
providing the password reset message to an administrator for the secured device.

7. The non-transitory computer readable medium of claim 6, further comprising instructions for encrypting at least a portion of the password reset message.

8. The non-transitory computer readable medium of claim 6, wherein the received new password is encrypted or a hashed password image is generated, by the administrator.

9. The non-transitory computer readable medium of claim 6, wherein the password reset message further comprises the counter to enable the secured device to compare the counter against a locally stored counter, wherein the password reset message is processed only if the counter value in the password reset message is larger than the locally maintained counter, and wherein if processed, the locally maintained counter is set to the larger value contained in the password reset message.

10. The non-transitory computer readable medium of claim 6, wherein the password reset message further comprises a time-frame indicator to enable the secured device to process the password reset message only if a locally available time is within a time-frame provided in the password reset message.

11. A system for generating a password reset message for resetting a password for a secured device, the system comprising a processor and memory, the memory storing computer executable instructions that when executed by the processor cause the system to:
receive a device identifier for the secured device and a new password;
sign a password image;
generate the password reset message using the device identifier and the new password, wherein the password reset message includes a digital signature and an encoded value derived using the new password, wherein the password image further comprises the device identifier and a replay protection value, wherein the replay protection value comprises a counter or random value or a combination of the counter and random value; and
provide the password reset message to an administrator for the secured device.

12. The system of claim 11, further comprising instructions for encrypting at least a portion of the password reset message.

13. The system of claim 11, wherein the received new password is encrypted or a hashed password image is generated, by the administrator.

14. The system of claim 11, wherein the password reset message further comprises the counter to enable the secured device to compare the counter against a locally stored counter, wherein the password reset message is processed only if the counter value in the password reset message is larger than the locally maintained counter, and wherein if processed, the locally maintained counter is set to the larger value contained in the password reset message.

15. The system of claim 11, wherein the password reset message further comprises a time-frame indicator to enable the secured device to process the password reset message only if a locally available time is within a time-frame provided in the password reset message.

16. A method of generating a password reset message for resetting a password for a secured device, the method comprising:
   receiving a device identifier for the secured device and a new password;
   generating the password reset message using the device identifier and the new password, wherein the password reset message further comprises a counter to enable the secured device to compare the counter against a locally stored counter, wherein the password reset message is processed only if the counter value in the password reset message is larger than the locally maintained counter, and wherein if processed, the locally maintained counter is set to the larger value contained in the password reset message; and
   providing the password reset message to an administrator for the secured device.

17. The method of claim 16, further comprising signing a password image and including a digital signature in the password reset message.

18. The method of claim 17, wherein the password image comprises an encoded value derived using the new password.

19. The method of claim 18, wherein the password image further comprises the device identifier, a replay protection value, and a random value.

20. The method of claim 16, further comprising encrypting at least a portion of the password reset message.

21. The method of claim 16, wherein the received new password is encrypted or a hashed password image is generated, by the administrator.

22. The method of claim 16, wherein the password reset message further comprises a time-frame indicator to enable the secured device to process the password reset message only if a locally available time is within a time-frame provided in the password reset message.

23. A system for generating a password reset message for resetting a password for a secured device, the system comprising a processor and memory, the memory storing computer executable instructions that when executed by the processor cause the system to:
   receive a device identifier for the secured device and a new password;
   generate the password reset message using the device identifier and the new password, wherein the password reset message further comprises a counter to enable the secured device to compare the counter against a locally stored counter, wherein the password reset message is processed only if the counter value in the password reset message is larger than the locally maintained counter, and wherein if processed, the locally maintained counter is set to the larger value contained in the password reset message; and
   provide the password reset message to an administrator for the secured device.

\* \* \* \* \*